United States Patent [19]

Schmitten et al.

[11] Patent Number: 4,849,308

[45] Date of Patent: Jul. 18, 1989

[54] MANIFOLD SEAL FOR FUEL CELL STACK ASSEMBLY

[75] Inventors: Phillip F. Schmitten, N. Huntingdon; Maynard K. Wright, Bethel Park, both of Pa.

[73] Assignee: The United States of America as represented by the United States Department of Energy, Washington, D.C.

[21] Appl. No.: 169,531

[22] Filed: Mar. 17, 1988

[51] Int. Cl.⁴ .................................. H01M 8/24
[52] U.S. Cl. ............................................ 429/37
[58] Field of Search ........................ 429/35, 36, 37

[56] References Cited

U.S. PATENT DOCUMENTS

| | | | |
|---|---|---|---|
| 4,212,929 | 7/1980 | Grevstad et al. | 429/37 |
| 4,374,185 | 2/1983 | Powers et al. | 429/36 |
| 4,414,294 | 11/1983 | Guthrie | 429/35 |
| 4,444,851 | 4/1984 | Maru | 429/26 |
| 4,508,793 | 4/1985 | Kamata et al. | 429/26 |
| 4,572,876 | 2/1986 | Spurrier | 429/34 |
| 4,604,331 | 8/1986 | Louis | 429/35 |
| 4,642,274 | 2/1987 | Tsutsumi et al. | 429/35 |
| 4,728,585 | 3/1988 | Briggs et al. | 429/37 |

FOREIGN PATENT DOCUMENTS

| | | | |
|---|---|---|---|
| 0112265 | 7/1983 | Japan | 429/35 |
| 0150277 | 9/1983 | Japan | 429/36 |
| 6059669 | 9/1983 | Japan | 429/36 |
| 0059670 | 4/1985 | Japan | 429/36 |
| 60-151973 | 8/1985 | Japan . | |

Primary Examiner—Donald L. Walton

[57] ABSTRACT

An assembly for sealing a manifold to a stack of fuel cells includes a first resilient member for providing a first sealing barrier between the manifold and the stack. A second resilient member provides a second sealing barrier between the manifold and the stack. The first and second resilient members are retained in such a manner as to define an area therebetween adapted for retaining a sealing composition.

7 Claims, 3 Drawing Sheets

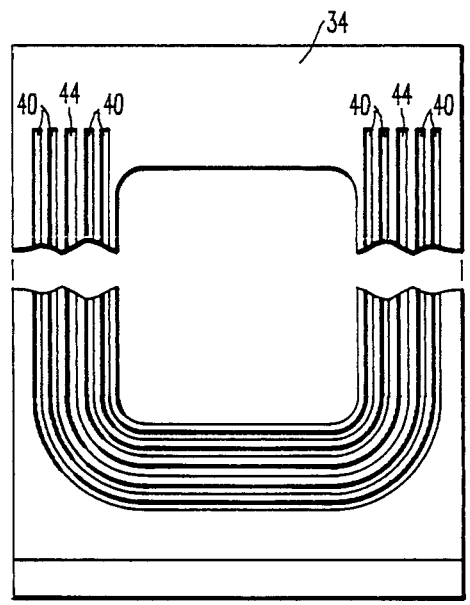
FIG. 5
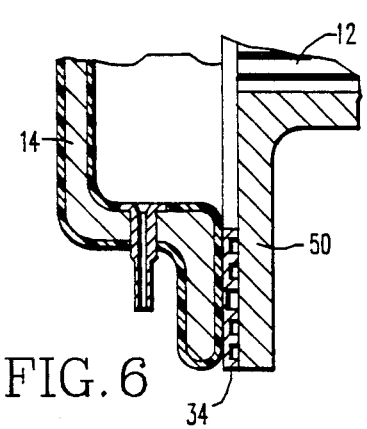
FIG. 6
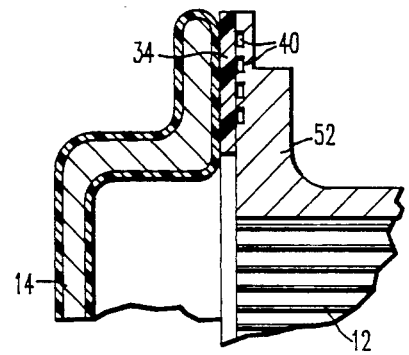
FIG. 7
FIG. 8
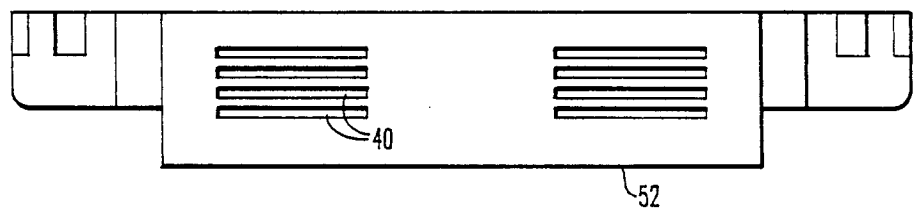

MANIFOLD SEAL FOR FUEL CELL STACK ASSEMBLY

GOVERNMENT CONTRACT

The invention disclosed herein was made or conceived in the course of or under a contract with the United States Government identified as DE-AC21-82MC24223.

BACKGROUND OF THE INVENTION

1. Field of the Invention

The present invention relates generally to a stack of fuel cells which are capable of converting the latent chemical energy of a fuel into electricity and, more particularly, to a manifold and manifold seal used in conjunction with such a stack of fuel cells.

2. Description of the Prior Art

Fuel cells used to convert the latent chemical energy of a fuel directly into electricity are well-known in the art. For example, see U.S. Pat. No. 4,463,068. Such cells may be based on a variety of electrochemical reactions. One well-known reaction is based on using hydrogen as a fuel which reacts with oxygen to generate electricity.

One common form for constructing a hydrogenoxygen cell is a laminated structure wherein an anode electrode and a cathode electrode are spaced apart by a porous layer of material which holds an electrolyte such as concentrated phosphoric acid. The hydrogen is guided by passageways behind the active region of the anode and the oxygen is guided by passageways behind the active region of the cathode. Both the anode and the cathode have a catalyst, such as platinum, deposited thereon.

At the anode, the hydrogen gas dissociates into hydrogen ions plus electrons in the presence of the catalyst. The hydrogen ions migrate through the electrolyte to the cathode in a process constituting ionic current transport while the electrons travel through an external circuit to the cathode. At the cathode, the hydrogen ions, electrons and molecules of oxygen combine to produce water.

It is known to orient the passageways behind the anode and cathode so as to have all of the inputs and outputs for both the oxidant and fuel oriented such that all of the fuel cells may be serviced by common manifolds. The sealing of such a manifold to a stack of fuel cells presents a variety of problems. First, the sealing surface of the stack of fuel cells presents an irregular, stepped surface due to manufacturing and stacking tolerances of the various components of the fuel cells. In addition to conforming to the irregular stack surface, the seal must withstand pressures of up to approximately five psi. Over the operational life of the fuel cell stack, the fuel cell stack tends to shrink, or creep. For a current 32 kilowatt 152 cell stack design, that creep is about one and one-half inches (3.8 cms). For a 100 kilowatt stack, the creep is about four and one-half inches (11.43 cms.) The manifold seal must remain operative as the fuel cell stack creeps over its operating life.

The manifold and seal must be capable of operating at temperatures of approximately 375° F. Where the electrolyte used by the fuel cell is phosphoric acid, the seal must be resistant to hot phosphoric acid and steam. The seal leakage should be less than 0.2% of flow at a differential pressure of approximately one-half psi. The manifold and seal assembly must accommodate stack bowing and maintain near constant seal loading.

The prior art has attempted to address those problems. In U.S. Pat. No. 4,212,929, a Fuel Cell Manifold Sealing System is disclosed. The sealing system includes a polymer seal frame firmly clamped between the manifold and the stack such that the seal frame moves with the stack. Thus, as the stack creeps, the seal frame creeps with it. Therefore, there is no sliding at the rough stack to seal frame interface. All of the sliding takes place on the smooth location between the seal frame and the manifold. Such a sealing system, however, creates two areas which must be sealed. The first is the area between the seal frame and the stack, which is a fixed, rigid connection, and the second is the area between the seal frame and the manifold which is a sliding type of connection. It is, therefore, desirable to have a manifold and seal which are capable of operating in the harsh environment presented by a stack of fuel cells over the life of the stack in a simple, yet reliable, manner.

SUMMARY OF THE PRESENT INVENTION

The present invention is directed to an assembly for sealing a manifold to a stack of fuel cells. The assembly includes a first resilient member for providing a first sealing barrier between the manifold and the stack. A second resilient member provides a second sealing barrier between the manifold and the stack. The first and second resilient members are held in such a manner so as to define an area therebetween adapted for retaining a sealing composition. The assembly also includes a plurality of retainer bars, tie rods, compression springs and the like for providing the force necessary to physically urge the manifold against the stack.

In one embodiment, the first and second resilient members include first and second Teflon cords and the sealing composition includes a fluorinated grease. When the seal assembly is compressed, the grease is forced into the small gaps between the Teflon cords and irregular stack surface such that a seal is established by the combination of the compliant cords and grease. To retain the Teflon cords from moving outward from the hydraulic force created by compressing the grease, the cords may be held within grooves formed in the manifold.

The Teflon cords are capable of being compressed as the fuel stack creeps over its operating life. The Teflon cords exhibit high tensile strength and are chemically inert. The fluorinated grease provides a good seal between the smooth surface of the manifold and the irregular surface of the fuel cell stack. The fluorinated grease can easily maintain the seal as the fuel cell stack creeps over its operating life. The fluorinated grease is appropriately choosen to satisfy the operating temperatures and pressures of the stack, as well as to be resistant to hot phosphoric acid and steam. Thus, the manifold and seal of the present invention are capable of being easily manufactured, reliably operated over the operational life of the stack, as well as being able to withstand the harsh operating conditions presented by the fuel cell stack. These and other advantages and benefits of the present invention will be apparent from a description of a preferred embodiment hereinbelow.

BRIEF DESCRIPTION OF THE DRAWINGS

In order that the present invention may be clearly understood and readily practiced, preferred embodiments will now be described, by way of example only, with reference to the accompanying Figures wherein:

FIG. 5 illustrates the grooves of the seal carrier;

FIG. 6 is a side view illustrating the connection of the bottom of the manifold to the stack;

FIG. 7 is a side view illustrating the connection of the top of the manifold to the stack; and FIG. 8 illustrates the grooves of the top compression plate.

DESCRIPTION OF A PREFERRED EMBODIMENT

Figure 1:
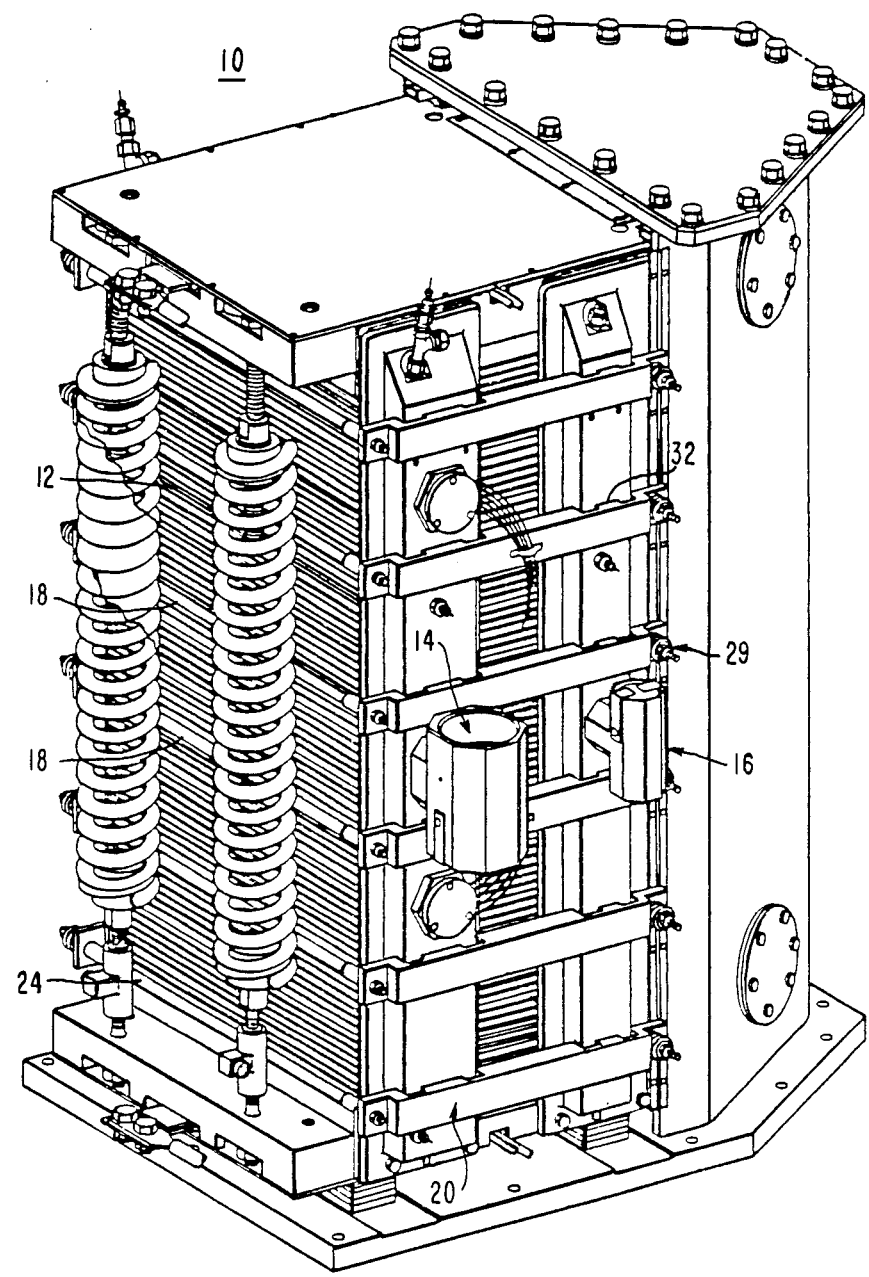
FIG. 1 is a perspective view of a stack assembly wherein two manifolds are visible.

In FIG. 1, a stack of fuel cells 10 having a manifold and manifold seal constructed according to the teachings of the present invention is illustrated. The stack of fuel cells 10 is comprised of a plurality of individual fuel cells 12. The individual fuel cells are constructed in a known manner of a pair of graphite plates (not shown) having sandwiched therebetween a pair of electrodes (not shown) and a matrix (not shown) for containing an electrolyte. The graphite plates contain ducts or passageways (not shown) for carrying an oxidant and a fuel. It is known to construct the graphite plates such that the inputs and outputs of the ducts are in the same position for each cell. Thus, when the cells are stacked one atop another, all of the inputs for the fuel ducts, outputs for the fuel ducts, inputs for the oxidant ducts and outputs for the oxidant ducts are oriented in a column. In this regard, see U.S. Pat. No. 4,572,876 for details concerning the construction of the graphite plates. With the inputs and outputs of the ducts oriented in a column, it thus becomes feasible to service each of the individual fuel cells 12 through a common manifold.

In FIG. 1, a first manifold 14 is illustrated which may be used to supply an oxidant, such as oxygen or air, to the individual fuel cells 12. A similar manifold (not shown) is positioned on the opposite side of the fuel cell stack 10 so as to collect oxygen which has not been used by the individual fuel cells 12.

A second manifold 16 operating as a fuel exit manifold is illustrated in FIG. 1. This manifold collects fuel which has not been used by the individual fuel cells 12. A similar manifold (not shown) is positioned on the opposite side of the fuel cell stack 10 so as to supply fuel to the individual fuel cells 12.

The manifolds 14 and 16 may be comprised of a metal, such as aluminum, coated with a fluoroplastic for electrical insulation and corrosion protection. High temperature structural plastics, such as polyphenylene sulphide, can also be used for manifold construction. A plastic manifold may be made, for example, from a commercially available material known as Ryton.

The manifold is physically pressed or urged against the fuel cell stack by a plurality of of retaining assemblies 18. One of the retaining assemblies 18 is shown in greater detail in FIG. 2.

Figure 2:
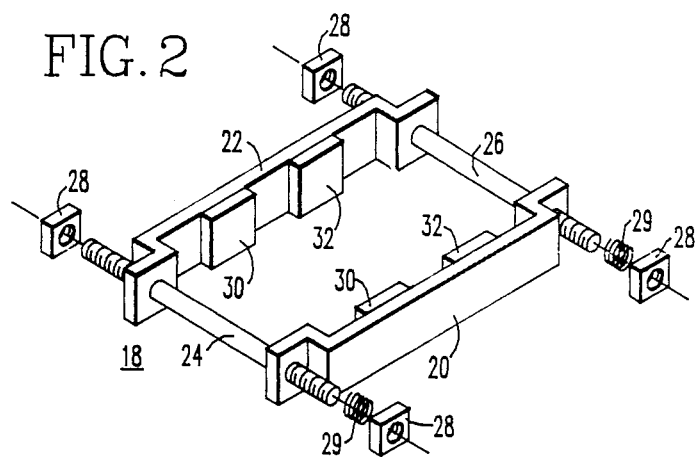
FIG. 2 is an exploded view of a pair of tie rods, two manifold retainer bars, retainer bar pads, and manifold compression springs used to retain the manifold.

In FIG. 2, the retaining assembly 18 can be seen to be comprised of a first manifold retainer bar 20, which is positioned on one side of the fuel cell stack 10, and a second manifold retainer bar 22, which is positioned on the opposite side of the fuel cell stack 10. The first retainer bar 20 and second retainer bar 22 are held together by first and second tie rods 24 and 26, respectively. The retaining assembly 18 is held together by a plurality of nuts 28 which are fastened on the threaded ends of the tie rods 24 and 26 as shown in FIG. 2. A pair of manifold compression springs 29 are provided, one each on one end of the tie rods 24 and 26, between the first manifold retainer bar 20 and the nuts 28.

The first manifold retainer bar 20 and second manifold retainer bar 22 each carry a first retainer bar pad 30 and a second retainer bar pad 32. The bar pads cause the force provided by the manifold compression springs 29 to be loaded in the center of the manifold, thereby equally dividing the spring load into four seal/stack load zones. It can be seen that by tightening nuts 28, the retaining assembly 18 is capable of retaining the manifolds in a proper orientation with respect to the fuel cell stack 10. The manifold compression springs 29 provide continuous physical urging to ensure a continuous seal between the manifolds and the fuel cell stack 10.

Figure 3:
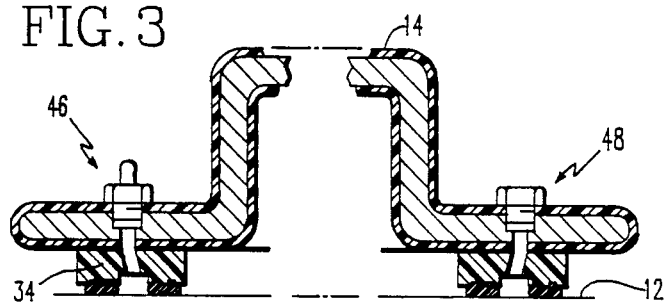
FIG. 3 is a cross-sectional view of a manifold attached to a stack.

The manifold 14 has a cross-sectional area, as shown in FIG. 3, that allows it to flex or bend rather easily such that it can conform to a bowed stack 10 by virtue of the loading provided by the manifold compression springs 29. As stated above, the manifolds are loaded in the center by the retaining assembly 18, specifically the retainer bar pads 30 and 32. This center loading is then divided equally at the seals to maintain a near constant load during thermal expansion and creep of the stack. It should be noted that all of the manifolds are constructed similarly such that a description of only manifold 14 is provided herein.

Figure 4:
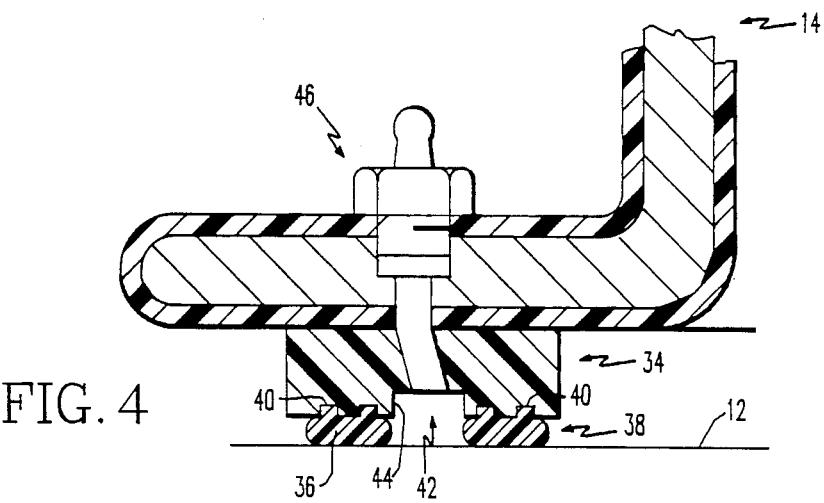
FIG. 4 is a close-up of a portion of FIG. 3 showing the seal detail.

Also seen in FIG. 3 is a seal carrier 34 shown in greater detail in FIGS. 4 and 5. Seal conformance to the irregular face of the stack 10 is accomplished by a pair of low density resilient members such as expanded Teflon cords 36 and 38 seen best in FIG. 4. The cords are flexible, compressible, and exhibit high tensile strength in addition to being chemically inert. The cords 36 and 38 are held in grooves 40 formed in the seal carrier 34. The grooves 40 in the seal carrier 34 retain the first and second Teflon cords 36 and 38, respectively, in such a manner so as to define an area 42 therebetween adapted for retaining a sealing composition. The seal carrier 34 may have an additional groove 44 so as to increase the area 42 for the sealing composition. The pattern for the grooves 40 and 44 in the seal carrier 34 are clearly shown in FIG. 5.

The area 42 between the cords 36 and 38 acts as a reservoir for a sealing composition such as a fluorinated grease. The first cord 36 provides a first sealing barrier while the second cord 38 provides a second sealing barrier. When the seal is compressed, the fluorinated grease is forced into any small gaps between the cords 36 and 38 and the irregular surface of the stack 10 such that a good seal is established. The grooves 40 prevent the cords 36 and 38 from moving outward from the hydraulic force created by compressing the grease. A slip plane is thus formed between the cords 36 and 38 and the seal carrier 34 to accommodate movement of the stack relative to the manifolds.

A series of grease fittings 46 and vent fittings 48 may be provided to permit renewal of the grease during maintenance outages of the stack. A vent fitting 48 appearing on the same side of a manifold as a grease fitting 46 may indicate when grease replacement is complete.

The grease used may be a modified commercially available grease known as Krytox. Commercially available Krytox has been found to have too much oil which was absorbed by interfacing material such that the residual Krytox "mud-cracked" which could potentially lead to seal leakage. To correct this, the Krytox had 10% weight addition of Teflon 60 which stiffened it such that there was no mud-cracking or texture change after 600 hours of operation at 375° F. Additionally, a fluoroelastomer coating can be applied to the face of the stack 10 at the interface with the seal to reduce absorption of oil from the grease into the cell edge. Such a coating also makes the irregular stack surface less severe and improves sealing.

The seal carrier 34 is rigidly connected to the manifold 14. The seal carrier 34 may be constructed of a high temperature structural plastic, such as polyphenylene sulphide. However, where the manifold is also made of a high temperature plastic, the seal carrier 34 can be eliminated by forming the grooves 40 and 44 directly into the manifold 14.

The manifold 14 is rigidly secured to a bottom compression plate 50 at the bottom of the fuel cell stack 10 as shown in FIG. 6. By virtue of that connection, the greatest amount of relative motion between the stack of fuel cells 10 and the manifold 14 occurs at the top of the stack. The connection between the manifold 14 and a top compression plate 52 of the stack of fuel cells 10 is illustrated in FIG. 7. Because the greatest amount of relative motion occurs at the top of the stack 10, the top compression plate 52 and the top portion of the manifold 14 are sized so the seal can be maintained despite contraction of the stack. It has been determined that for a 100 kilowatt stack, the creep may be as much as four and one-half inches (11.43 cms).

At the top of the stack, the seal carrier 34 is smooth as seen in FIG. 5. The grooves 40 needed to retain the first and second Teflon cords 36 and 38, respectively, are formed in the top compression plate 52 as shown in FIG. 8. These grooves trap the Teflon cords in the same manner as the grooves of the seal carrier 34 trap the Teflon cords. The gripping of the Teflon cords by the grooves of the top compression plate 52 force the smooth portion of the seal carrier 34 to slide against the cords when there is relative motion between the stack 10 and manifold 14. The horizontal grooves of the compression plate 52 do not bisect any of the sealing barriers.

The ability of the seal of the present invention to properly function under operating conditions has been demonstrated by prototype testing at operating temperatures. A test was performed using air at a pressure of one-half psig. A thermal cycle was comprised of three hours to heat up from 145° F. to 375° F., holding a temperature of 375° F. for a period of 6 hours, and cool down from 375° F. to 145° F. in approximately 15 hours. A prototype seal approximately 4 inches (10.16 cms) across the top and bottom and approximately 44.3 inches (112.52 cms) along the sides was tested. The first and second cords 36 and 38, respectively, were strips of 0.25 inch (0.64 cms) diameter Gortex with Krytox grease retained between the Gortex. The Gortex was held on a serrated Teflon seal carrier 34 which was epoxy cemented to the manifold 14. The seal was applied to a stack of 239 graphite plates. After sixty-five thermal cycles, the cumulative movement of the seal was measured at 1.8 inches (4.57 cms). At all times, seal leakage remained within acceptable limits.

A plastic manifold constructed of Ryton was developed and tested on a stack. Six thermal cycles between 150° F. and 375° F. were performed with no detectable leakage after the test.

While the present invention has been described in connection with an exemplary embodiment thereof, it will be understood that many modifications and variations will be readily apparent to those of ordinary skill in the art. This disclosure and the following claims are intended to cover all such modifications and variations.

We claim as our invention:

1. A fuel cell stack having an improved manifold seal capable of withstanding cell stack creep, comprising:
   a top and a bottom compression plate;
   a plurality of fuel cells positioned between said compression plates and defining a fuel cell stack;
   a plurality of manifolds for supplying fuel and a reactant to said plurality of cells, each of said manifolds being rigidly connected to said bottom compression plate;
   first resilient sealing means for providing a first sealing barrier between each of said manifolds and said stack and said compression plates;
   second resilient means for providing a second sealing barrier between each of said manifolds and said stack and said compression plates;
   first retaining means associated with said manifolds for retaining said first and second resilient means in such a manner as to define an area therebetween adapted for retaining a sealing composition; and
   second retaining means associated with said top compression plate for retaining said first and second resilient means in such a manner as to define an area therebetween adapted for retaining a sealing composition.

2. The assembly of claim 1 wherein said first retaining means includes a seal carrier having grooves for retaining said first and second resilient means.

3. The assembly of claim 1 wherein said first retaining means includes grooves carried by said plurality of manifolds.

4. The assembly of claim 1 additionally comprising means for physically urging said plurality of manifolds against the stack.

5. The assembly of claim 4 wherein the means for urging includes retainer bars and tie rods oriented about said stack to hold said plurality of manifolds in place, and compression springs positioned between said retainer bars and tie rods for urging said plurality of manifolds against the stack.

6. The fuel cell stack of claim 1 additionally comprising a fluroroelastomer coating applied to the stack in the area of the interface between said first and second resilient sealing means and the stack.

7. The assembly of claim 1 wherein said second retaining means includes grooves formed in said top compression plate for retaining said first and second resilient means.

* * * * *